US011188473B1

(12) United States Patent
Lee et al.

(10) Patent No.: US 11,188,473 B1
(45) Date of Patent: Nov. 30, 2021

(54) CACHE RELEASE COMMAND FOR CACHE READS IN A MEMORY SUB-SYSTEM

(71) Applicant: Micron Technology, Inc., Boise, ID (US)

(72) Inventors: Eric N. Lee, San Jose, CA (US); Yoav Weinberg, Thornhill (CA)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 16/949,512

(22) Filed: Oct. 30, 2020

(51) Int. Cl.
| G06F 12/00 | (2006.01) |
| G06F 12/0882 | (2016.01) |
| G06F 12/0817 | (2016.01) |
| G06F 9/30 | (2018.01) |
| G06F 12/0891 | (2016.01) |

(52) U.S. Cl.
CPC ...... *G06F 12/0882* (2013.01); *G06F 9/30047* (2013.01); *G06F 9/30101* (2013.01); *G06F 12/0828* (2013.01); *G06F 12/0891* (2013.01)

(58) Field of Classification Search
CPC ............ G06F 12/0882; G06F 9/30047; G06F 9/30101; G06F 12/0828; G06F 12/0891
See application file for complete search history.

(56) References Cited

U.S. PATENT DOCUMENTS

| 2003/0212865 | A1* | 11/2003 | Hicken | G06F 12/0804 711/135 |
| 2008/0104329 | A1* | 5/2008 | Gaither | G06F 12/0888 711/138 |
| 2008/0256303 | A1* | 10/2008 | Croxford | G06F 12/1027 711/144 |

* cited by examiner

*Primary Examiner* — Gurtej Bansal
(74) *Attorney, Agent, or Firm* — Lowenstein Sandler LLP

(57) ABSTRACT

A memory device includes a page cache comprising a cache register, a memory array configured with a plurality of memory planes, and control logic, operatively coupled with the memory array. The control logic receives, from a requestor, a first cache read command requesting first data from the memory array spread across the plurality of memory planes, and returns, to the requestor, data associated with a first subset of the plurality of memory planes and pertaining to a previous read command, while concurrently copying data associated with a second subset of the plurality of memory planes and pertaining to the previous read command into the cache register. The control logic further receives, from the requestor, a cache release command, and returns, to the requestor, the data associated with the second subset of the plurality of memory planes and pertaining to the previous read command, while concurrently copying data associated with the first subset of the plurality of memory planes and pertaining to the first cache read command into the cache register.

20 Claims, 6 Drawing Sheets

CACHE RELEASE COMMAND FOR CACHE READS IN A MEMORY SUB-SYSTEM

TECHNICAL FIELD

Embodiments of the disclosure relate generally to memory sub-systems, and more specifically, relate to a cache release command for cache reads in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
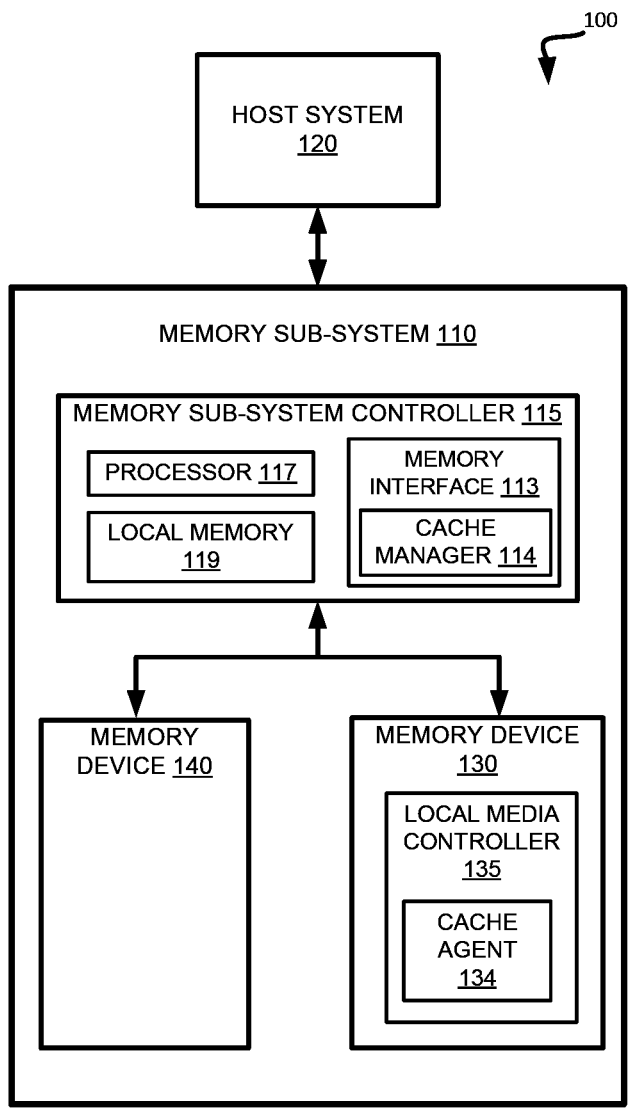
FIG. 1 illustrates an example computing system that includes a memory sub-system in accordance with some embodiments of the present disclosure.

Aspects of the present disclosure are directed to use of a cache release command for cache reads in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional or a three-dimensional grid. Memory cells are etched onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include multiple access line driver circuits and power circuits that can be shared by the planes of the memory device to facilitate concurrent access of pages of two or more memory planes, including different page types. For ease of description, these circuits can be generally referred to as independent plane driver circuits. Depending on the storage architecture employed, data can be stored across the memory planes (i.e., in stripes). Accordingly, one request to read a segment of data (e.g., corresponding to one or more data addresses), can result in read operations performed on two or more of the memory planes of the memory device.

In certain memory devices, when a read command or cache read command is received from a requestor, such as a memory sub-system controller coupled to the memory device, there is a delay period, referred to herein as the cache read latency time (tRCBSY), that occurs before the requested data can be returned to the requestor. During this delay period, the requested data is relocated internally within the memory device. For example, the data can be copied from a memory array (e.g., including multiple planes) of the memory device to a page cache of the memory device. The data can be written first to a data register of the page cache and then from the data register to a cache register of the page cache, from where the data can be output to the requestor. If, for example, the data from a previous read command or cache read command was read from the array and stored in the data register, during the delay period (e.g., tRCBSY) of the next read command or cache read command, the data is copied from the data register before it is output to the requestor. This delay period, to allow for internal data transfer, increases the overall latency of the read operation. This results in inefficient communication bus utilization (i.e., between the memory device and the requestor), as there are significant periods when no data is being transferred, which negatively impacts the overall performance of the memory sub-system.

Aspects of the present disclosure address the above and other deficiencies by implementing a cache release command for cache reads in a memory sub-system. In one embodiment, the cache release command allows for concurrent processing of two actions corresponding to a read operation performed on a memory device. For example, when responding to a read request or a cache read request corresponding to data spread across multiple memory planes of a memory array of the memory device, the data can be divided into two memory plane groups. In one embodiment, each memory plane group includes one half of the memory planes of the memory device. Thus, if there are four memory planes in the memory device, a first memory plane group can include two planes (e.g., P0 and P1) and the second memory plane group can include two planes (e.g., P2 and P3). The cache release command allows data from each plane group to be processed concurrently (e.g., at least partially overlapping in time).

In one embodiment, the memory device receives, from a requestor, a first cache read command requesting first data from the memory array spread across multiple memory planes. In response, the memory device can return, to the requestor, data from a first memory plane group and pertaining to a previous read command. This data can be returned from the cache register of a page cache of the memory device. Concurrently, the memory device can read data from a second memory plane group and pertaining to the first cache read command and copy that into the cache register. Having received the data from the previous read command, the requestor can issue a cache release command. If the memory device receives the cache release command during the read operation, the memory device can immediately return, to the requestor, the data from the second memory plane group and pertaining to the first cache read command from the cache register, while concurrently copying data from the first memory plane group and pertaining to the first cache read command into the cache register.

Advantages of this approach include, but are not limited to, improved performance in the memory sub-system. In the manner described herein, the return of data from one memory plane group in the cache register can occur concurrently with the copying of other data from another memory plane group into the cache register. Thus, the memory device need not wait for the delay period while data is relocated internally within the memory device. Accordingly, the efficient utilization of the communication bus between the memory device and the requestor is improved, as there are no longer significant periods when no data is being transferred. As a result, the overall read throughput of the memory sub-system is increased.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface, Open NAND Flash Interface (ONFI) interface, or some other interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which includes a raw memory device 130 having control logic (e.g., local media controller 135) on the die and a controller (e.g., memory sub-system controller 115) for media management within the same memory device package. An example of a managed memory device is a managed NAND (MNAND) device.

In one embodiment, the memory sub-system 110 includes a memory interface component 113, which includes cache manager 114. Memory interface component 113 is responsible for handling interactions of memory sub-system controller 115 with the memory devices of memory sub-system 110, such as memory device 130. For example, memory interface component 113 can send memory access commands corresponding to requests received from host system 120 to memory device 130, such as program commands, read commands, or other commands. In addition, memory interface component 113 can receive data from memory device 130, such as data retrieved in response to a read command or a confirmation that a program command was successfully performed. In some embodiments, the memory sub-system controller 115 includes at least a portion of the cache manager 114. For example, the memory sub-system controller 115 can include a processor 117 (processing device) configured to execute instructions stored in local memory 119 for performing the operations described herein. In some embodiments, the memory interface component 113 is part of the host system 110, an application, or an operating system. In one embodiment, memory interface 113 includes cache manager 114, among other sub-components. Cache manager 114 can direct memory access commands, such as a read command, a cache read command, or a cache release command, to memory device 130. In one embodiment, memory device 130 includes a cache agent 134 configured to carry out corresponding memory access operations, in response to receiving the memory access commands from cache manager 114. In some embodiments, local media controller 135 includes at least a portion of cache agent 134 and is configured to perform the functionality described herein. In some embodiment, cache agent 134 is implemented on memory device 130 using firmware, hardware components, or a combination of the above.

In one embodiment, cache agent 134 receives, from a requestor, such as cache manager 114, a first cache read command requesting first data from a memory array of memory device 130 spread across multiple memory planes. In response, cache agent 134 can return, to the requestor, data from a first memory plane group and pertaining to a previous read command. This data can be returned from the cache register of a page cache of the memory device 130. Concurrently, the cache agent 134 can read data from a second memory plane group and pertaining to the first cache read command and copy that into the cache register. Having received the data from the previous read command, cache manager can issue a cache release command. If the cache agent 134 receives the cache release command during the read operation, the cache agent 134 can immediately return, to cache manager 114, the data from the second memory plane group and pertaining to the first cache read command from the cache register, while concurrently copying data from the first memory plane group and pertaining to the first cache read command into the cache register. Thus, data can be clocked out of memory device 130 immediately upon receipt of the first cache read command, without the need for a delay period (e.g., tRCBSY) while data is relocated internally within the memory device (e.g., copied from the data register to the cache register). Further details with regards to the operations of cache manager 114 and cache agent 134 are described below.

Figure 2:
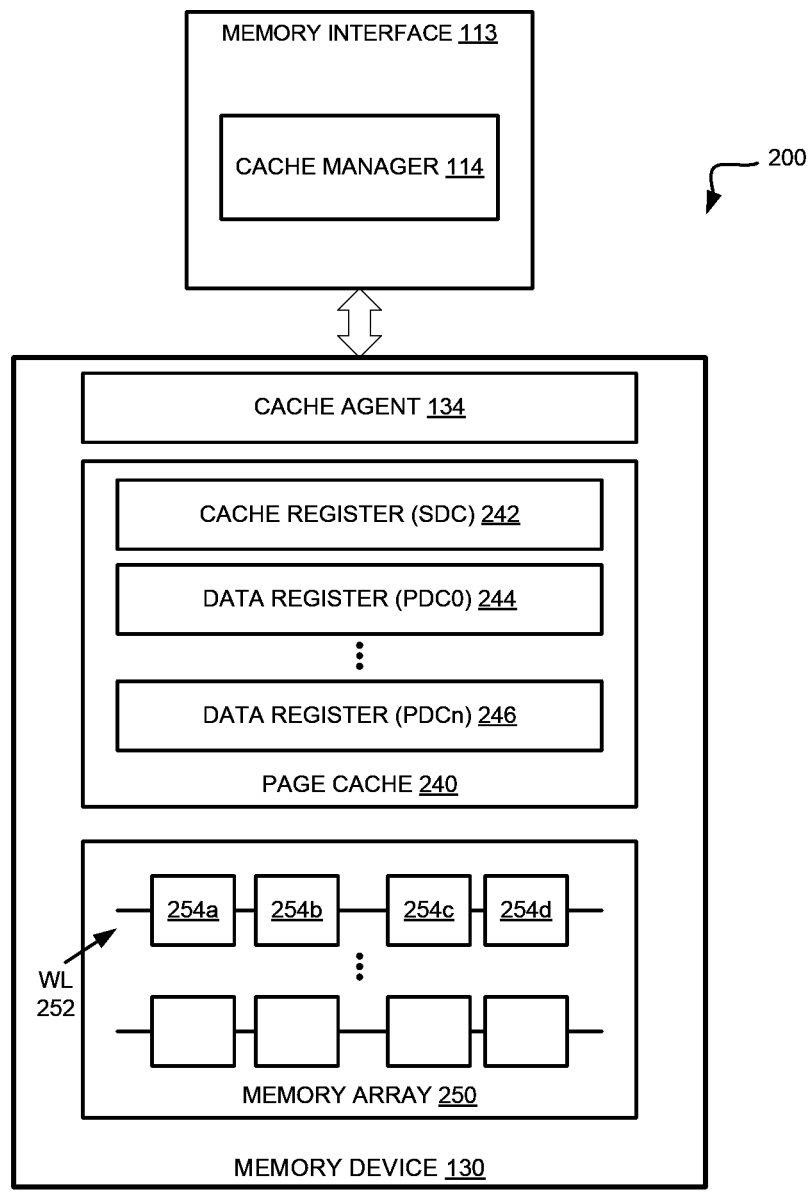
FIG. 2 is a block diagram illustrating a memory sub-system implementing a cache release command for cache reads in accordance with some embodiments of the present disclosure.

FIG. 2 is a block diagram 200 illustrating a memory sub-system implementing a cache release command for cache reads in accordance with some embodiments of the present disclosure. In one embodiment, memory interface 113 is operatively coupled with memory device 130. In one embodiment, memory device 130 includes a page cache 240 and a memory array 250. Memory array 250 can include an array of memory cells formed at the intersections of wordlines, such as wordline 252, and bitlines (not shown). In one embodiment, the memory cells are grouped in to blocks, which can be further divided into sub-blocks, where a given wordline, such as wordline 252, is shared across a number of sub-blocks 254a, 254b, 254c, 254d, for example. In one embodiment, each sub-block corresponds to a separate plane in the memory array 250. The group of memory cells associated with a wordline within a sub-block is referred to as a physical page. Each physical page in one of the sub-blocks can include multiple page types. For example, a physical page formed from single level cells (SLCs) has a single page type referred to as a lower logical page (LP). Multi-level cell (MLC) physical page types can include LPs and upper logical pages (UPs), TLC physical page types are LPs, UPs, and extra logical pages (XPs), and QLC physical page types are LPs, UPs, XPs and top logical pages (TPs). For example, a physical page formed from memory cells of the QLC memory type can have a total of four logical pages, where each logical page can store data distinct from the data stored in the other logical pages associated with that physical page.

Depending on the programming scheme used, each logical page of a memory cell can be programmed in a separate programming pass, or multiple logical pages can be programmed together. For example, in a QLC physical page, the LP can be programmed on one pass, and the UP, XP and TP can be programmed on a second pass. Other programming schemes are possible. In this example, however, prior to programming the UP, XP, and TP in the second pass, the data from the LP is first read from the physical page in memory array 250 and can be stored in the page cache 240 of memory device 130. The page cache 240 is a buffer used to temporarily store data being read from or written to memory array 250 of memory device 130, and can include a cache register 242 and one or more data registers 244-246. For a read operation, the data is read from memory array 250 into one of data registers 244-246, and then into cache register 242. Memory interface 113 can then read out the data from cache register 242. For a program operation, memory interface 113 writes the data to cache register 242, which is then passed to one of data registers 244-246, and finally programmed to memory array 250. If the program operation includes multiple pages (e.g., UP, XP, and TP), each page can have a dedicated data register to hold the corresponding page data.

In one embodiment, cache manager 114 issues a first cache read command, which is received by cache agent 134. The first cache read command can identify data to be read from memory array 250, including data spread across multiple memory planes (e.g., sub-blocks 254a, 254b, 254c, 254d). In response, cache agent 134 can return, to the cache manager 113, data from cache register 242 that is associated with a first memory plane group and is pertaining to a previous read command. Concurrently, the cache agent 134 can read data from a second memory plane group and pertaining to the first cache read command and copy that into the cache register 242 (e.g., from data register 244). Having received the data from the previous read command, cache manager 114 can issue a cache release command. If the cache agent 134 receives the cache release command during the read operation, the cache agent 134 can immediately return, to cache manager 114, the data from the second memory plane group and pertaining to the first cache read command from the cache register 242, while concurrently copying data from the first memory plane group and pertaining to the first cache read command into the cache register 242. A similar process can occur with subsequent data as additional cache read commands and cache release commands are issued by cache manager 114 and received by cache agent 134.

Figure 3:
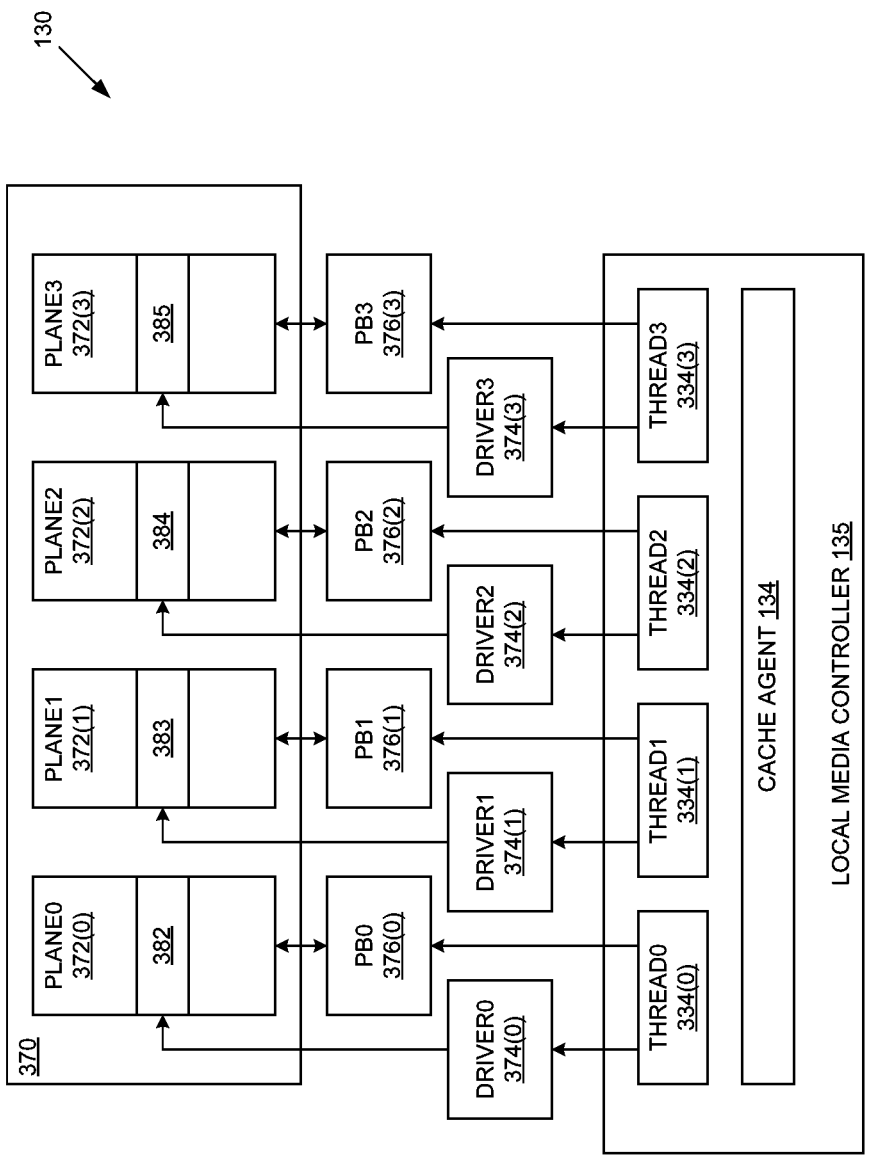
FIG. 3 is a block diagram illustrating a multi-plane memory device configured for parallel plane access in accordance with some embodiments of the present disclosure.

FIG. 3 is a block diagram illustrating a multi-plane memory device 130 configured for independent parallel plane access in accordance with some embodiments of the present disclosure. The memory planes 372(0)-372(3) can each be divided into blocks of data, with a different relative block of data from two or more of the memory planes 372(0)-372(3) concurrently accessible during memory access operations. For example, during memory access operations, two or more of data block 382 of the memory plane 372(0), data block 383 of the memory plane 372(1), data block 384 of the memory plane 372(2), and data block 385 of the memory plane 372(3) can each be accessed concurrently.

The memory device 130 includes a memory array 370 divided into memory planes 372(0)-372(3) that each includes a respective number of memory cells. The multi-plane memory device 130 can further include local media controller 135, including a power control circuit and access control circuit for concurrently performing memory access operations for different memory planes 372(0)-372(3). The memory cells can be non-volatile memory cells, such as NAND flash cells, or can generally be any type of memory cells.

The memory planes 372(0)-372(3) can each be divided into blocks of data, with a different relative block of data from each of the memory planes 372(0)-372(3) concurrently accessible during memory access operations. For example, during memory access operations, data block 382 of the memory plane 372(0), data block 383 of the memory plane 372(1), data block 384 of the memory plane 372(2), and data block 385 of the memory plane 372(3) can each be accessed concurrently.

Each of the memory planes 372(0)-372(3) can be coupled to a respective page buffer 376(0)-376(3). Each page buffer 376(0)-376(3) can be configured to provide data to or receive data from the respective memory plane 372(0)-372 (3). The page buffers 376(0)-376(3) can be controlled by local media controller 135. Data received from the respective memory plane 372(0)-372(3) can be latched at the page buffers 376(0)-376(3), respectively, and retrieved by local media controller 135, and provided to the memory subsystem controller 115 via an ONFI interface, for example.

Each of the memory planes 372(0)-372(3) can be further coupled to a respective access driver circuit 374(0)-374(3), such as an access line driver circuit. The driver circuits 374(0)-374(3) can be configured to condition a page of a respective block of an associated memory plane 372(0)-372 (3) for a memory access operation, such as programming data (i.e., writing data), reading data, or erasing data. Each of the driver circuits 374(0)-374(3) can be coupled to a respective global access lines associated with a respective memory plane 372(0)-372(3). Each of the global access lines can be selectively coupled to respective local access lines within a block of a plane during a memory access operation associated with a page within the block. The driver circuits 374(0)-374(3) can be controlled based on signals from local media controller 135. Each of the driver circuits 374(0)-374(3) can include or be coupled to a respective power circuit, and can provide voltages to respective access lines based on voltages provided by the respective power circuit. The voltages provided by the power circuits can be based on signals received from local media controller 135.

The local media controller 135 can control the driver circuits 374(0)-374(3) and page buffers 376(0)-376(3) to concurrently perform memory access operations associated with each of a group of memory command and address pairs (e.g., received from memory sub-system controller 115). For example, local media controller 135 can control the driver circuits 374(0)-374(3) and page buffer 376(0)-376(3) to perform the concurrent memory access operations. Local media controller 135 can include a power control circuit that serially configures two or more of the driver circuits 374 (0)-374(3) for the concurrent memory access operations, and an access control circuit configured to control two or more of the page buffers 376(0)-376(3) to sense and latch data from the respective memory planes 372(0)-372(3), or program data to the respective memory planes 372(0)-372(3) to perform the concurrent memory access operations.

In operation, local media controller 135 can receive a group of memory command and address pairs via ONFI bus, with each pair arriving in parallel or serially. In some examples, the group of memory command and address pairs can each be associated with different respective memory planes 372(0)-372(3) of the memory array 370. The local media controller 135 can be configured to perform concurrent memory access operations (e.g., read operations or program operations) for the different memory planes 372 (0)-372(3) of the memory array 370 responsive to the group of memory command and address pairs. For example, the power control circuit of local media controller 135 can serially configure, for the concurrent memory access operations based on respective page type (e.g., UP, MP, LP, XP, SLC/MLC/TLC/QLC page), the driver circuits 374(0)-374 (3) for two or more memory planes 372(0)-372(3) associated with the group of memory command and address pairs. After the access line driver circuits 374(0)-374(3) have been configured, the access control circuit of local media controller 135 can concurrently control the page buffers 376 (0)-376(3) to access the respective pages of each of the two or more memory planes 372(0)-372(3) associated with the group of memory command and address pairs, such as retrieving data or writing data, during the concurrent memory access operations. For example, the access control circuit can concurrently (e.g., in parallel and/or contemporaneously) control the page buffers 376(0)-376(3) to charge/discharge bitlines, sense data from the two or more memory planes 372(0)-372(3), and/or latch the data.

Based on the signals received from local media controller 135, the driver circuits 374(0)-374(3) that are coupled to the memory planes 372(0)-372(3) associated with the group of memory command and address command pairs can select blocks of memory or memory cells from the associated memory plane 372(0)-372(3), for memory operations, such as read, program, and/or erase operations. The driver circuits 374(0)-374(3) can drive different respective global access lines associated with a respective memory plane 372(0)-372 (3). As an example, the driver circuit 374(0) can drive a first voltage on a first global access line associated with the memory plane 372(0), the driver circuit 374(1) can drive a second voltage on a third global access line associated with the memory plane 372(1), the driver circuit 374(2) can drive a third voltage on a seventh global access line associated with the memory plane 372(2), etc., and other voltages can be driven on each of the remaining global access lines. In some examples, pass voltages can be provided on all access lines except an access line associated with a page of a memory plane 372(0)-372(3) to be accessed. The local media controller 135, the driver circuits 374(0)-374(3) can allow different respective pages, and the page buffers 376 (0)-376(3) within different respective blocks of memory cells, to be accessed concurrently. For example, a first page of a first block of a first memory plane can be accessed concurrently with a second page of a second block of a second memory plane, regardless of page type.

The page buffers 376(0)-376(3) can provide data to or receive data from the local media controller 135 during the memory access operations responsive to signals from the local media controller 135 and the respective memory planes 372(0)-372(3). The local media controller 135 can provide the received data to memory sub-system controller 115.

It will be appreciated that the memory device 130 can include more or less than four memory planes, driver circuits, and page buffers. It will also be appreciated that the respective global access lines can include 8, 16, 32, 64, 128, etc., global access lines. The local media controller 135 and the driver circuits 374(0)-374(3) can concurrently access different respective pages within different respective blocks of different memory planes when the different respective pages are of a different page type. For example, local media controller 135 can include a number of different processing threads, such as processing threads 334(0)-334(3). Each of processing threads 334(0)-334(3) can be associated with a respective one of memory planes 372(0)-372(3) and can manage operations performed on the respective plane. For example, each of processing threads 334(0)-334(3) can provide control signals to the respective one of driver circuits 374(0)-374(3) and page buffers 376(0)-376(3) to perform those memory access operations concurrently (e.g., at least partially overlapping in time).

In one embodiment, cache agent 134 receives and processes memory access commands, such as read commands, cache read commands, and cache release commands, sent by a requestor. The cache release commands allows for concurrent processing of two actions corresponding to a read operation performed on memory device 130. For example, when responding to a read request or a cache read request corresponding to data spread across multiple memory planes, such as memory planes 372(0)-372(3) of memory array 370 of the memory device 130, the data can be divided into two memory plane groups. In one embodiment, each memory play group includes one half of the memory planes of the memory device 130. Thus, if there are four memory planes in the memory device 130, a first memory plane group can include two planes (e.g., 372(0) and 372(1)) and the second memory plane group can include two planes (e.g., 372(2) and 372(3)). The cache release command allows data from each plane group to be processed concurrently (e.g., at least partially overlapping in time), such that data from one plane group can be clocked out to the requestor, while data from another plane group is being relocated internally within the memory device 130.

Figure 4:
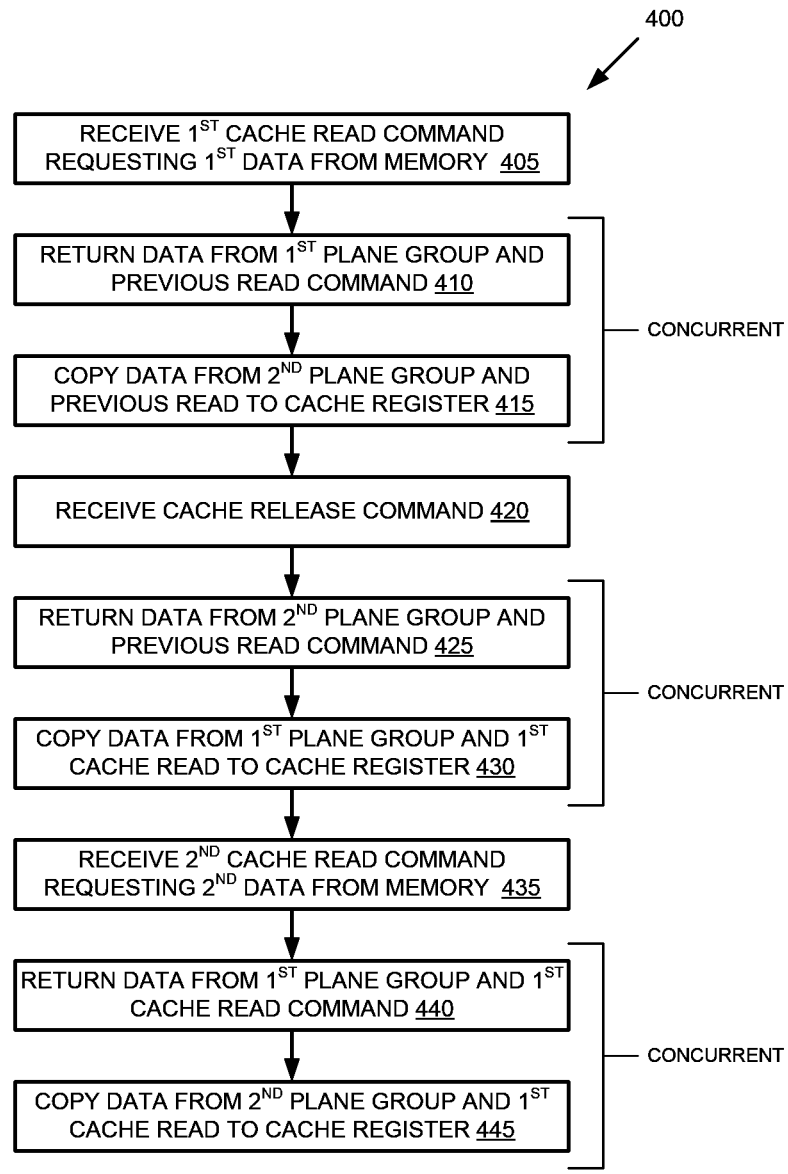
FIG. 4 is a flow diagram of an example method of processing a cache release command for cache reads in a memory sub-system in accordance with some embodiments of the present disclosure.

FIG. 4 is a flow diagram of an example method of processing a cache release command for cache reads in a memory sub-system in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by cache manager 114 and cache agent 134 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 5:
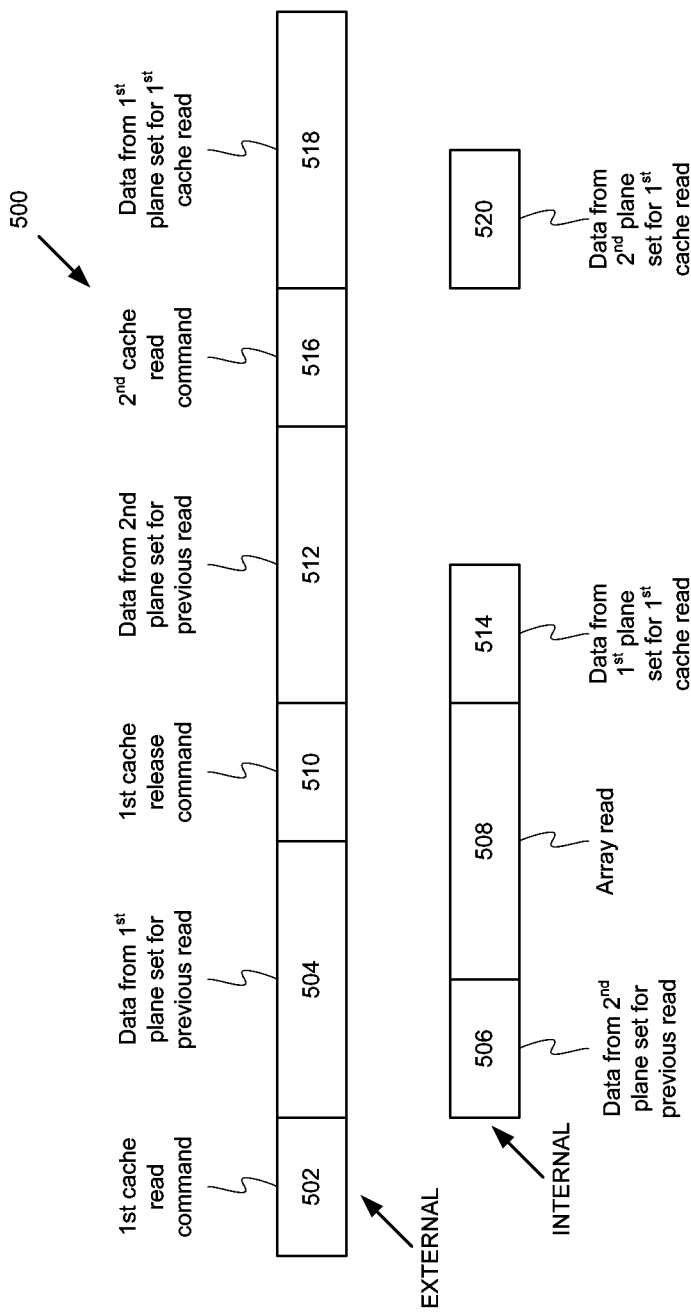
FIG. 5 is a timing diagram illustrating processing a cache release command for cache reads in a memory sub-system in accordance with some embodiments of the present disclosure.

At operation 405, a command/request is received. For example, processing logic (e.g., cache agent 134) can receive a memory access command/request, such as a first cache read command 502, as illustrated in FIG. 5. FIG. 5 is a timing diagram illustrating processing a cache release command for cache reads in a memory sub-system in accordance with some embodiments of the present disclosure. In one embodiment, the first cache read command is received from a requestor, such as cache manager 114 of memory sub-system controller 115. In one embodiment, the first cache read command requests first data from a memory array, such as memory array 250 or 370, and spread across multiple memory planes, such as memory planes 372(0)-372(3). For example, the first data could be stored in sub-blocks 254a-d and associated with word line 252. In other embodiments, the requestor can include some other component in memory sub-system 110, or host system 120.

Referring again to FIG. 4, at operation 410, data is returned. For example, the processing logic can return data to the requestor, such as data associated with a first plane group (e.g., a first subset of the multiple memory planes of the multi-plane memory device 130) and pertaining to a previous read command/request (i.e., a read command/request that was received prior to the first cache read command received at operation 405). This can include data 504, as illustrated in FIG. 5. In one embodiment, the first plane group includes one half of the multiple memory planes of memory device 130, such as memory planes 372(0) and 372(1), for example. In other embodiments, the first plane group can include some other number of memory planes, such as one memory plane, or more memory planes. Since the data is pertaining to a previous read command/request, the data can have previously been retrieved from the memory array and copied into one of data registers 244, 246 and then into cache register 242. In one embodiment, the processing logic sends the data from the cache register 242 to the requestor via an ONFI bus coupled between the memory device 130 and the memory sub-system controller 115.

At operation 415, data is relocated internally within memory device 130. For example, the processing logic can copy data to cache register 242, such as data associated with a second plane group (e.g., a second subset of the multiple memory planes of the multi-plane memory device 130) and pertaining to the previous read command/request. This can include data 506, as illustrated in FIG. 5, which can be the portion of the first data requested by the previous read command which was stored on the memory planes of the second plane group in the memory array. In one embodiment, the second plane group includes one half of the multiple memory planes of memory device 130, such as memory planes 372(2) and 372(3), for example. In other embodiments, the second plane group can include some other number of memory planes, such as one memory plane, or more memory planes. In one embodiment, the processing logic performs an array read 508 to retrieve the data, copies the data into one of data registers 244, 246 and then into cache register 242. In one embodiment, operations 410 and 415 are performed concurrently (i.e., at least partially overlapping in time). For example, one processing thread can manage the return of data to the requestor, while at the same time, another processing thread can manage the copy of data into the cache register 242.

At operation 420, a command/request is received. For example, the processing logic can receive a cache release command, such as cache release command 510, as illustrated in FIG. 5. In one embodiment, the cache release command is received from the requestor, such as cache manager 114 of memory sub-system controller 115. In one embodiment, the cache release command indicates that the data associated with the first plane group and pertaining to the previous read command was received by the requestor.

At operation 425, data is returned. For example, the processing logic can return data to the requestor, such as data associated with the second plane group and pertaining to the previous read command. This can include data 512, as illustrated in FIG. 5. In one embodiment, the data can have previously been retrieved from the memory array and copied into one of data registers 244, 246 and then into cache register 242 (i.e., at operation 415). Depending on the embodiment, the processing logic sends the data from the cache register 242 to the requestor via the ONFI bus, or some other communication channel.

At operation 430, data is relocated internally within memory device 130. For example, the processing logic can copy data to cache register 242, such as data associated with the first plane group and pertaining to the first cache read command. This can include data 514, as illustrated in FIG. 5, which can be the portion of the first data requested by the first cache read command which was stored on the memory planes of the first plane group in the memory array. In one embodiment, the processing logic copies the data into one of data registers 244, 246 and then into cache register 242. In one embodiment, operations 425 and 430 are performed concurrently (i.e., at least partially overlapping in time). For example, one processing thread can manage the return of data to the requestor, while at the same time, another processing thread can manage the copy of data into the cache register 242.

At operation 435, a command/request is received. For example, the processing logic can receive a memory access command/request, such as a second cache read command 516, as illustrated in FIG. 5. In one embodiment, the second cache read command is received from the requestor, such as cache manager 114 of memory sub-system controller 115. In one embodiment, the second cache read command requests second data from a memory array, such as memory array 250 or 370, and spread across multiple memory planes, such as memory planes 372(0)-372(3). In other embodiments, the requestor can include some other component in memory sub-system 110, or host system 120.

At operation 440, data is returned. For example, the processing logic can return data to the requestor, such as data associated with the first plane group and pertaining to the first cache read command. This can include data 518, as illustrated in FIG. 5. In one embodiment, the data can have previously been retrieved from the memory array and copied into one of data registers 244, 246 and then into cache register 242 (i.e., at operation 430). Depending on the embodiment, the processing logic sends the data from the cache register 242 to the requestor via the ONFI bus, or some other communication channel.

At operation 445, data is relocated internally within memory device 130. For example, the processing logic can copy data to cache register 242, such as data associated with the second plane group and pertaining to the first cache read command. This can include data 520, as illustrated in FIG. 5, which can be the portion of the second data requested by the first cache read command which was stored on the memory planes of the second plane group in the memory array. In one embodiment, the processing logic copies the data into one of data registers 244, 246 and then into cache register 242. In one embodiment, operations 440 and 445 are performed concurrently (i.e., at least partially overlapping in time). For example, one processing thread can manage the return of data to the requestor, while at the same time, another processing thread can manage the copy of data into the cache register 242. This sequence can continue in similar fashion as additional cache read commands and cache release commands are received from the requestor and processed accordingly by the control logic of the memory device 130.

Figure 6:
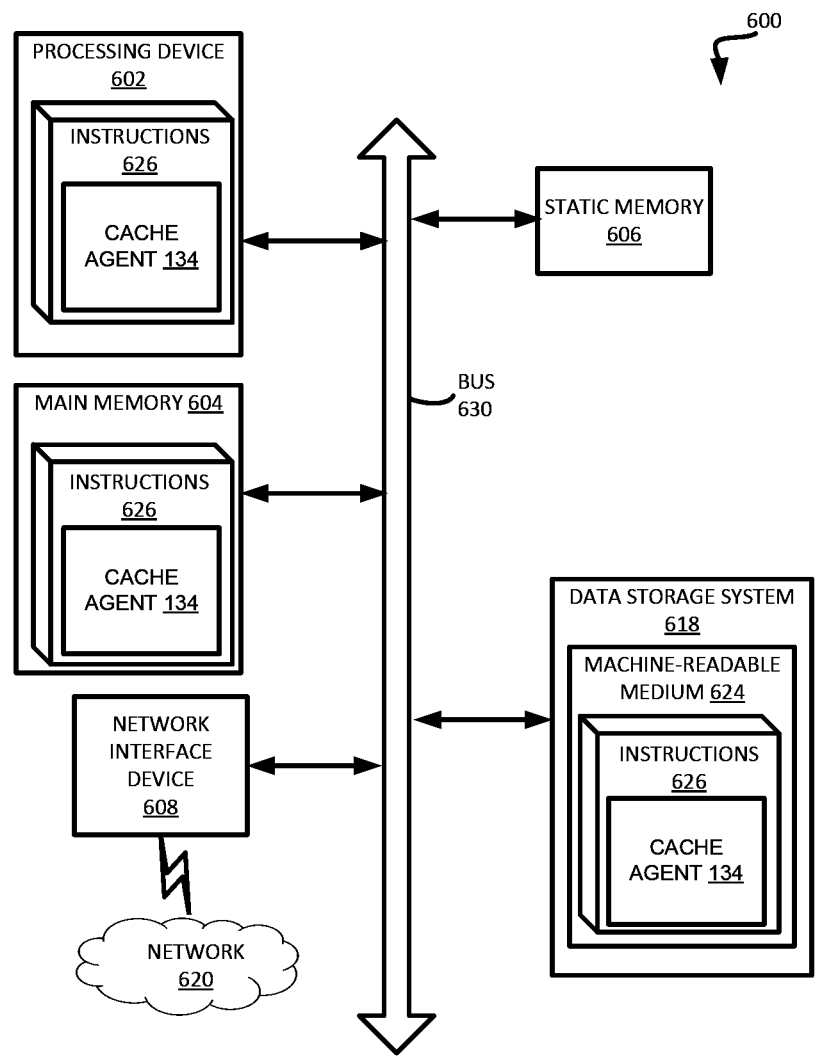
FIG. 6 is a block diagram of an example computer system in which embodiments of the present disclosure can operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to cache manager 114 and/or cache agent 134 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium, such as a non-transitory computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to cache manager 114 and/or cache agent 134 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory device comprising:
    a page cache comprising a cache register;
    a memory array configured with a plurality of memory planes; and
    control logic, operatively coupled with the memory array, to perform operations comprising:
        receiving, from a requestor, a first cache read command requesting first data from the memory array spread across the plurality of memory planes;
        returning, to the requestor, data associated with a first subset of the plurality of memory planes and pertaining to a previous read command, while concurrently copying data associated with a second subset of the plurality of memory planes and pertaining to the previous read command into the cache register;
        receiving, from the requestor, a cache release command indicating that the data associated with the first subset of the plurality of memory planes and pertaining to the previous read command was received by the requestor; and
        returning, to the requestor, the data associated with the second subset of the plurality of memory planes and pertaining to the previous read command, while concurrently copying data associated with the first subset of the plurality of memory planes and pertaining to the first cache read command into the cache register.

2. The memory device of claim 1, wherein the first subset and the second subset of the plurality of memory planes each comprise one half of the plurality of memory planes of the memory array.

3. The memory device of claim 1, wherein the page cache further comprises a data register, and wherein copying data into the cache register comprises copying data from the memory array to the data register and from the data register to the cache register.

4. The memory device of claim 1, wherein the requestor comprises a memory sub-system controller of a memory sub-system comprising the memory device.

5. The memory device of claim 4, wherein returning data to the requestor comprises sending the data from the cache register to the requestor via an Open NAND Flash Interface (ONFI) bus coupled between the memory device and the memory sub-system controller.

6. The memory device of claim 1, wherein the control logic to perform further operations comprising:
    receiving, from the requestor, a second cache read command requesting second data from the memory array spread across the plurality of memory planes.

7. The memory device of claim 6, wherein the control logic to perform further operations comprising:

returning, to the requestor, data associated with the first subset of the plurality of memory planes and pertaining to the first cache read command, while concurrently copying data associated with the second subset of the plurality of memory planes and pertaining to the first cache read command into the cache register.

8. A method comprising:

receiving, at a multi-plane memory device and from a requestor, a first cache read request indicating first data;

sending, to the requestor, data from a first plane group comprising one or more planes of the multi-plane memory device and associated with a previous read request, while concurrently relocating data from a second plane group comprising one or more planes of the multi-plane memory device and associated with the previous read request internally within the multi-plane memory device;

receiving, at the multi-plane memory device and from the requestor, a cache release request indicating that the data from the first plane group and associated with the previous read request was received by the requestor; and sending, to the requestor, the data from the second plane group and associated with the previous read command, while concurrently relocating data from the first plane group and associated with the first cache read request internally within the multi-plane memory device.

9. The method of claim 8, wherein the first plane group and the second plane group each comprise one half of a plurality of memory planes of multi-plane memory device.

10. The method of claim 8, wherein a page cache of the memory device comprises a data register and a cache register, and wherein relocating data within the multi-plane memory device comprises copying data from a memory array of the multi-plane memory device to the data register and from the data register to the cache register.

11. The method of claim 8, wherein the requestor comprises a memory sub-system controller of a memory sub-system comprising the multi-plane memory device.

12. The method of claim 11, wherein sending data to the requestor comprises sending the data from the cache register to the requestor via an Open NAND Flash Interface (ONFI) bus coupled between the memory device and the memory sub-system controller.

13. The method of claim 8, further comprising:

receiving, at the multi-plane memory device and from the requestor, a second cache read request indicating second data.

14. The method of claim 13, further comprising:

sending, to the requestor, data from the first plane group and associated with the first cache read command, while concurrently relocating data from the second plane group and associated with the first cache read command internally within the multi-plane memory device.

15. A method comprising:

receiving, at a memory device and from a requestor, a first cache read command requesting first data from a memory array of the memory device and spread across a plurality of memory planes of the memory device;

returning, to the requestor, data associated with a first subset of the plurality of memory planes and pertaining to a previous read command, while concurrently copying data associated with a second subset of the plurality of memory planes and pertaining to the previous read command into a cache register of the memory device;

receiving, from the requestor, a cache release command indicating that the data associated with the first subset of the plurality of memory planes and pertaining to the previous read command was received by the requestor; and returning, to the requestor, the data associated with the second subset of the plurality of memory planes and pertaining to the previous read command, while concurrently copying data associated with the first subset of the plurality of memory planes and pertaining to the first cache read command into the cache register.

16. The method of claim 15, wherein the first subset and the second subset of the plurality of memory planes each comprise one half of the plurality of memory planes of the memory array.

17. The method of claim 15, wherein the requestor comprises a memory sub-system controller of a memory sub-system comprising the memory device.

18. The method of claim 17, wherein returning data to the requestor comprises sending the data from the cache register to the requestor via an Open NAND Flash Interface (ONFI) bus coupled between the memory device and the memory sub-system controller.

19. The method of claim 15, further comprising:

receiving, from the requestor, a second cache read command requesting second data from the memory array spread across the plurality of memory planes.

20. The method of claim 19, further comprising:

returning, to the requestor, data associated with the first subset of the plurality of memory planes and pertaining to the first cache read command, while concurrently copying data associated with the second subset of the plurality of memory planes and pertaining to the first cache read command into the cache register.

* * * * *